United States Patent [19]

Hwang

[11] Patent Number: 4,548,191
[45] Date of Patent: Oct. 22, 1985

[54] FOOD COOKING OVEN AND METHOD

[75] Inventor: Yong Y. Hwang, Huron, Ohio

[73] Assignee: Stein Associates, Inc., Sandusky, Ohio

[21] Appl. No.: 592,030

[22] Filed: Mar. 22, 1984

[51] Int. Cl.$^4$ .............................................. A21B 1/00
[52] U.S. Cl. .................................. 126/21 A; 126/20; 99/443 C; 34/207; 34/211; 432/124; 432/129; 432/144; 432/199
[58] Field of Search .............. 126/20, 21 A; 432/121, 432/124, 129, 136, 144, 199; 99/352, 395, 443 C; 219/388, 400; 34/203, 207, 208, 211

[56] References Cited

U.S. PATENT DOCUMENTS

| | | | |
|---|---|---|---|
| 3,229,378 | 1/1966 | Gerrish | 34/207 X |
| 4,067,318 | 1/1978 | Flaith et al. | 34/208 |
| 4,252,055 | 2/1981 | Johansson et al. | 99/443 C X |
| 4,307,286 | 12/1981 | Guibert | 219/400 |
| 4,309,938 | 1/1982 | Harmon | 99/443 C X |
| 4,479,310 | 10/1984 | Duc | 34/207 X |

FOREIGN PATENT DOCUMENTS

| | | | |
|---|---|---|---|
| 652406 | 12/1964 | Belgium | 99/443 C |
| 2208584 | 8/1973 | Fed. Rep. of Germany | 34/207 |
| 2530926 | 2/1984 | France | 126/21 A |
| 17493 | of 1906 | United Kingdom | 99/443 C |
| 0612672 | 6/1978 | U.S.S.R. | 99/443 C |

Primary Examiner—Margaret A. Focarino
Attorney, Agent, or Firm—Baldwin, Egan & Fetzer

[57] ABSTRACT

An oven and method for cooking food products. The oven comprises an elongated housing having an inlet for food products to be cooked in the oven and an outlet for emitting cooked food product from the oven, together with means for heating a gaseous cooking medium in the housing for cooking the food products therein, and a plurality of vertically tiered endless conveyors for passing the food product back and forth through the housing during the cooking process, whereby an oven taking less floor space for a predetermined flow path extent of cooking various food products, is provided.

13 Claims, 5 Drawing Figures

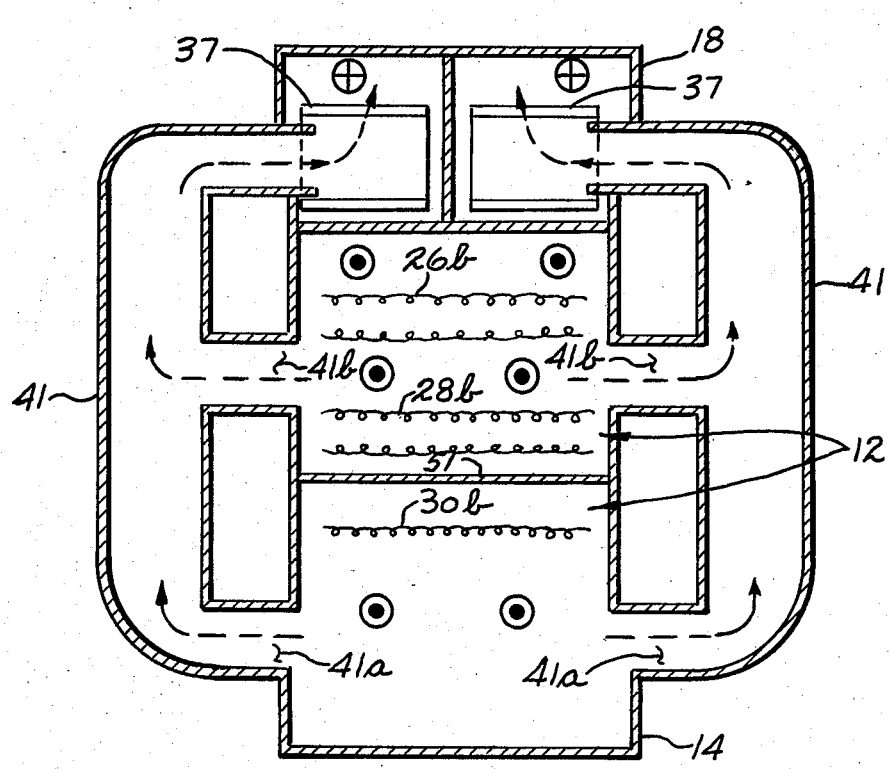
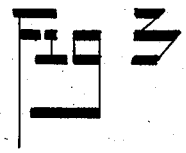
---→ COOKING MEDIUM FLOW
⊙ COOKING MEDIUM FLOW TOWARD VIEWER
⊕ COOKING MEDIUM FLOW AWAY FROM VIEWER

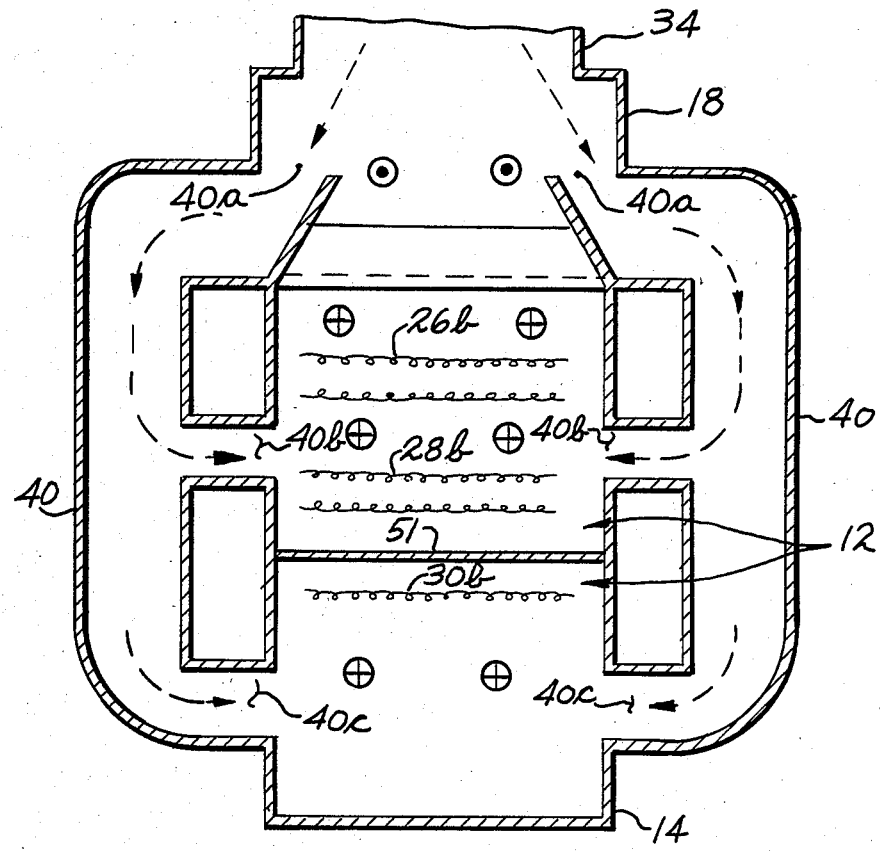
Fig. 4
- - - → COOKING MEDIUM FLOW
⊙ COOKING MEDIUM FLOW TOWARD VIEWER
⊕ COOKING MEDIUM FLOW AWAY FROM VIEWER

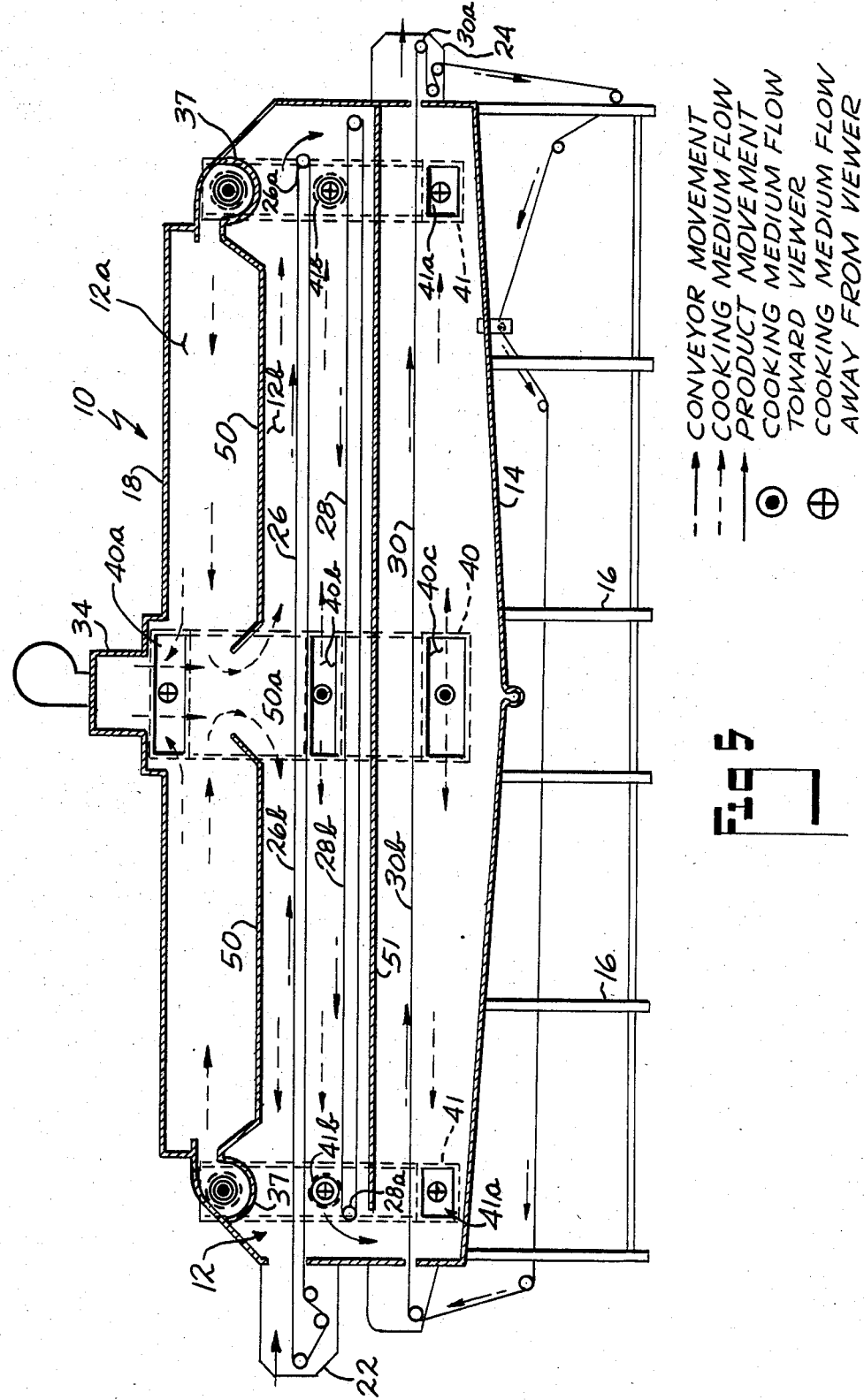

FOOD COOKING OVEN AND METHOD

This invention relates in general to ovens for cooking food, and more particularly to an oven for cooking food which requires less floor space as compared to prior art food cooking oven arrangements for a flow path of food product, by providing a plurality of vertically tiered endless conveyors in the oven housing, whereby the food product is passed back and forth through the oven housing from the inlet thereof to the outlet thereof while a gaseous cooking or heating medium is applied to the food product, for cooking the latter.

BACKGROUND OF THE INVENTION

Food cooking ovens embodying endless conveyors, are well known in the art. Many different types and styles of ovens are available for cooking various types of food products.

Applicant's assignee manufactures a food product cooking oven known in the trade as a "CFO" oven (counter-flow oven) wherein food product is inserted in the inlet of the oven onto an endless conveyor therein and the food product is carried through the oven on the conveyor while gaseous cooking medium is applied to the food product on the conveyor, both above and below the conveyor, thereby tending to provide uniformly cooked product, regardless of the conveyor belt loading. The conveyor runs in the opposite direction (or counterflow) to a portion of the cooking medium flow path, thus resulting in the aforementioned designation "CFO" for the oven. The cooking medium in such a "CFO" oven is circulated throughout the oven by fans, where it is repeatedly reheated and conducted through the oven for further use in the cooking process. Varied food products such as hamburgers, breaded fish, chicken and the likes are effectively cookable in such type of known ovens.

However, sometimes the food product is of a type or size or content wherein an unduly long dimension oven is required in order to properly cook the food product as it passes from the inlet to the outlet of the oven. Such an elongated oven requires excessive floor space, and generally requires larger components for heating and circulation of the cooking medium over the lengthwise extend of the path of travel of the food product conveyor thereof.

SUMMARY OF THE INVENTION

The present invention provides a cooking oven and a method for cooking, which utilizes therein a plurality of vertically tiered, endless conveyors for carrying the food product through the oven housing during the cooking of the food product, and wherein the conveyor mechanisms are so constructed and arranged so that the food product is passed back and forth through the oven housing from the inlet end thereof to the outlet end thereof, while the gaseous cooking medium is applied to the food product to cook the latter, resulting in a shorter, more efficient oven, thus saving floor space as well as representing a more efficient and effective utilization of the flow of the gaseous cooking medium through the oven in the process of cooking the food products therein.

Accordingly, an object of the invention is to provide a novel oven for cooking food products, and one that is of a considerably lesser overall lengthwise dimension as compared to prior art ovens providing an equivalent range of food product cooking travel dimension.

A further object of the invention is to provide an oven of the novel type wherein the cooking medium is applied intermediate the ends of the oven housing and dispered from such intermediate position toward opposite ends of the oven housing, to accomplish the cooking process, so that part of the cooking medium from such intermediate position flows in the direction of conveyor movement, while other of the cooking medium flows in a direction opposite to the direction of movement of the associated endless conveyor mechanism, and then the heating medium is returned adjacent the ends of the housing back to the source of heat where it is again heated up and reused in the cooking process.

A still further object of the invention is to provide an oven of the above mentioned type wherein there is provided a plurality of individual endless conveyor mechanisms for carrying the food product through the oven housing, with the conveyor mechanisms being vertically tiered and being driven in opposite lengthwise directions so that the food product is carried back and forth through the housing from the inlet and eventually to the outlet thereof, thus providing and extent of travel of the food product in the housing subjected to the cooking medium substantially greater than the overall lengthwise extent of the housing, resulting in an oven that requires substantially less floor space and one that is more efficient and effective in the application of the cooking or heating medium to the food product adapted to be cooked in the oven.

Other objects and advantages of the invention will be apparent from the following description taken in conjunction with the accompanying drawings wherein:

BRIEF DESCRIPTION OF THE DRAWINGS

FIG. 3 is a diagrammatical transverse sectional view taken on line 3—3 or line 3a—3a of FIG. 1;

FIG. 4 is a diagrammatical transverse sectional view taken on line 4—4 or line 4a—4a of FIG. 1; and FIG. 5 is a diagrammatical longitudinal sectional view taken on line 5—5 of FIG. 2.

DESCRIPTION OF PREFERRED EMBODIMENT

Figure 1:
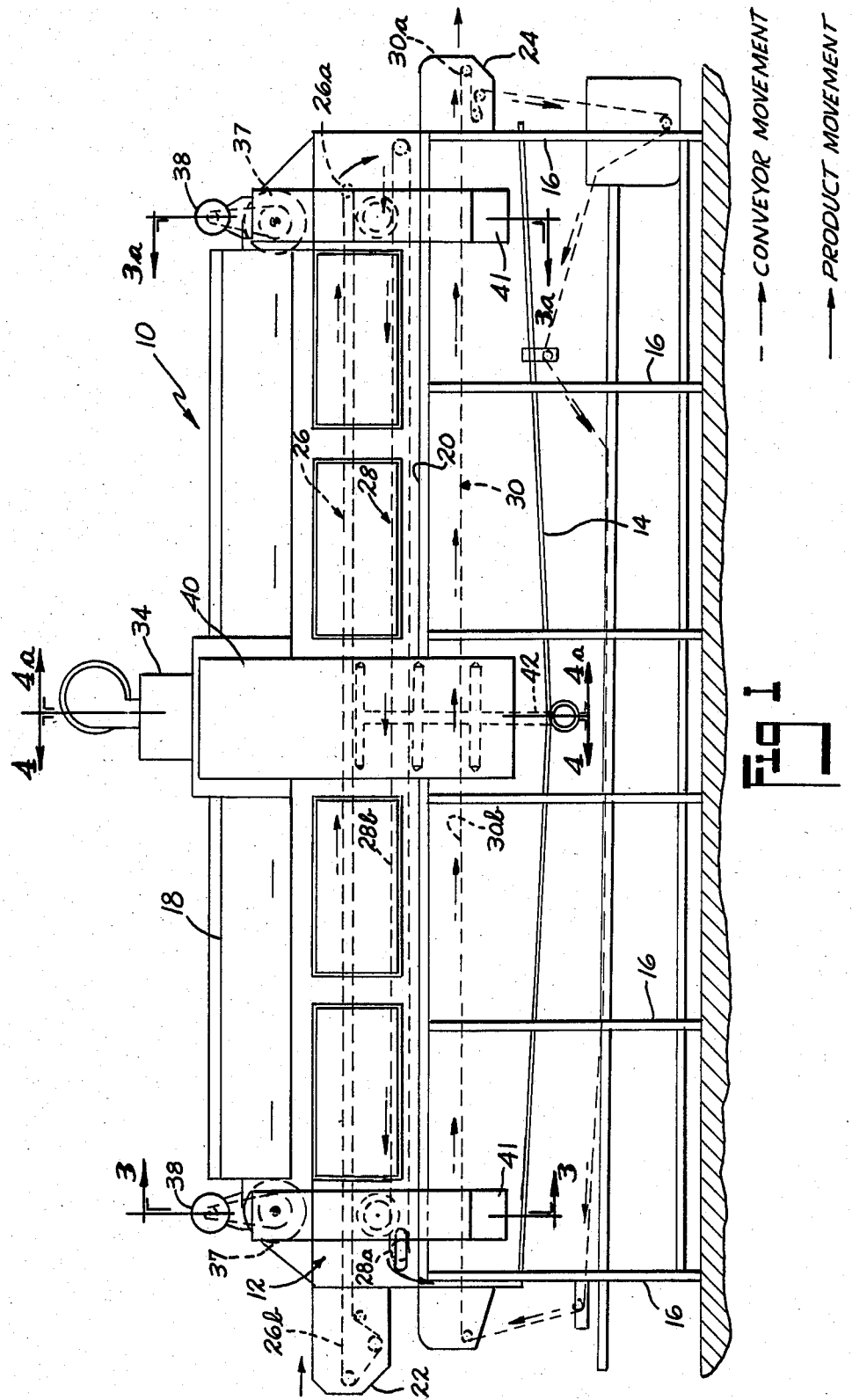
FIG. 1 is a side elevational, generally diagrammatic illustration of a vertically tiered conveyor arrangement of oven for cooking food products in accordance with the invention.
Figure 2:
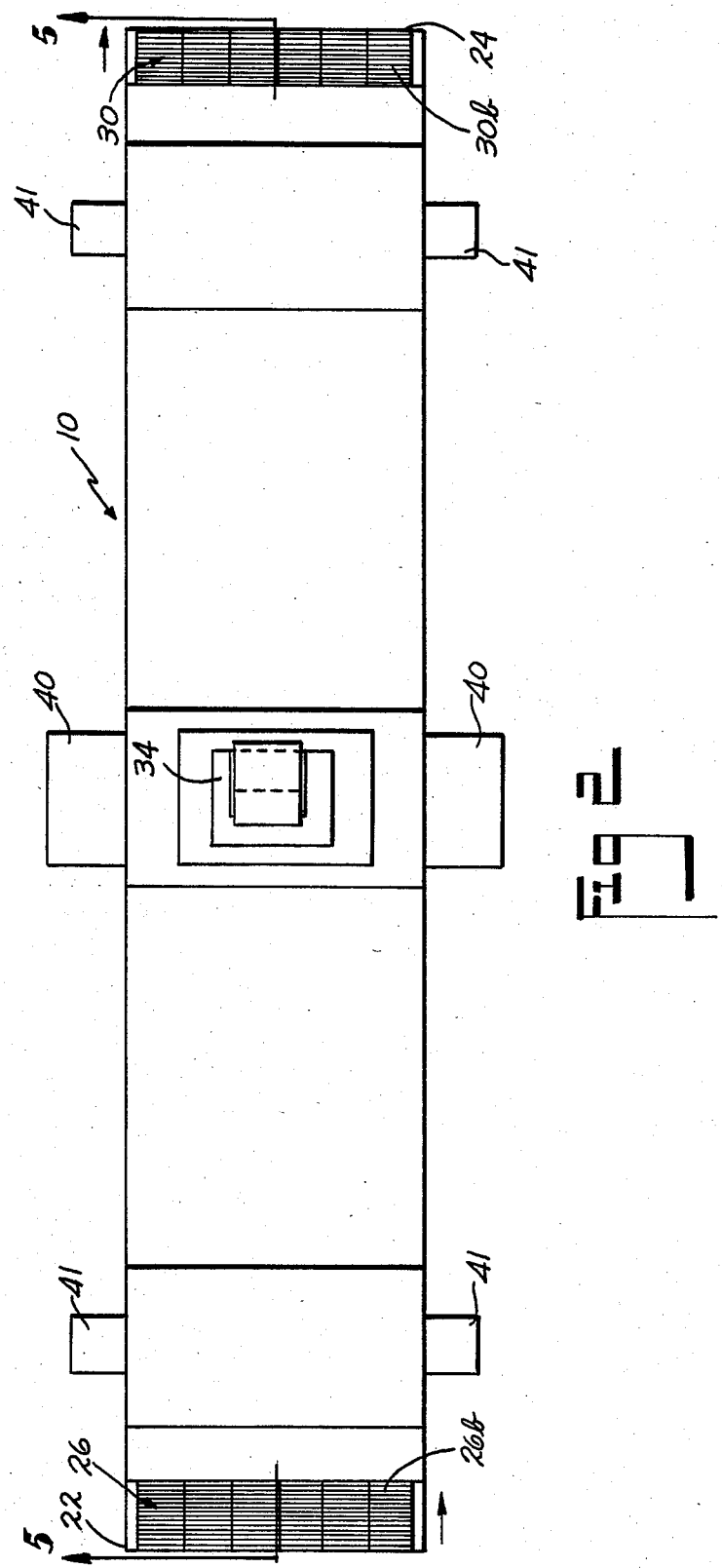
FIG. 2 is a top plan, generally diagrammatic view of the oven of FIG. 1.

The cooking oven 10 comprises a housing 12 which in the embodiment illustrated consists of a lower portion 14 supported on legs 16, and an upper portion 18, which preferably is separable by vertical movement away from the lower portion, to expose the interior of the housing 12. A seal, such as for instance a suitable water seal (known in the art) can be provided between the juncture 20 of housing section 14 and housing section 18, for sealing the sections together against the inadvertent emission of the heated cooking medium (e.g. the cooking gases).

Housing 12 is of a tunnel-like affair having an inlet end 22 and an outlet end 24 for respectively the input and the output of the food product to be cooked in the oven 10. A first endless conveyor 26 is mounted interiorly of the housing and is adapted to receive the food product to be cooked on the upper stretch 26b of the permeable conveyor belt thereof, for transporting the food product through the housing of the oven. Conveyor 26 can be powered or motor driven so as to cause movement of its belt by any suitable power means, but preferably consisting of a hydraulic motor unit means (not shown) for driving the belt. The belt can be made for instance from wire mesh, well known in the art. As illustrated in the drawing, conveyor 26 is adapted to be driven in a direction from left to right, as illustrated by the dot-dash arrows, showing the direction of movement of the belt 26b of conveyor 26.

The discharge end of conveyor 26 is disposed above a second powered conveyor 28 mounted in the housing, with the top stretch 28b of the permeable belt of conveyor 28 being adapted to be driven from right to left as illustrated by the dot-dash arrows in FIG. 1. Accordingly, the food product disposed on the upper stretch 26b of conveyor 26, when it reaches the discharge end 26a of the conveyor 26, is discharged down onto the underlying belt 28b of the conveyor mechanism 28. During such gravity discharging of the food product onto the conveyor 28, the food product will conventionally be reversed or "flipped" in its position, so that the bottom of the food product as oriented on conveyor 26 will be "up" or on the top as disposed on the conveyor mechanism 28.

Similarly the discharge end 28a of conveyor mechanism 28 is disposed above another endless conveyor mechanism 30 disposed below conveyor mechanism 28, so that the food product transported through the housing 12 on conveyor mechanism 28 when it reaches the discharge end 28a thereof, is "flipped" so that the side that was down, lands on the conveyor 30 with such side generally in "up" position.

Conveyor mechanism 30 is adapted to be driven from left to right, as viewed in FIG. 1, and passes the food product back through the housing 12 for further cooking thereof. When the food product reaches the discharge end 30a of conveyor mechanism 30, the product is discharged from the oven. The direction of travel of the upper stretch 30b of the permeable conveyor belt of conveyor mechanism 30 is shown in dot-dash arrows.

It will be seen therefore that the conveyor mechanisms 26, 28 and 30 are disposed in vertically tiered orientation, or condition in the housing 12, and cause the food product to be passed back and forth through the housing 12 from the inlet end 22 to the outlet end 24, for cooking the food product.

As best seen in FIGS. 3, 4 and 5, housing 12 is internally divided into three sub-chambers in vertically tiered orientation, separation being accomplished by horizontal baffles 50 and 51. Baffle 50 separates the top sub-chamber 12a from the middle sub-chamber 12b and is partially discontinuous directly under the heating means 34. Baffle 51 separates the middle sub-chamber 12b from the bottom sub-chamber 12c and is discontinuous at the left or infeed end of the housing 12, to permit product to flip from conveyor belt 28b to conveyor belt 30b as described above.

The three sub-chambers are connected together outside of the housing 12 by vertical ducts 40 and 41. Ducts 40 convey cooking medium to the middle and bottom sub-chambers as later described, and ducts 41 convey the cooking medium from the bottom and middle subchambers to circulating fans 37 as later described.

The embodiment of oven illustrated includes an intermediate positioned combination gas burner and blower unit 34, which continually reheats the cooking medium circulating through the housing 12. The products of combustion, namely hot water vapor (steam) and carbon dioxide, are directly mixed with the cooking medium and serve to replenish the small amount of medium lost through openings at the infeed and discharge ends of the oven 10.

Further control of the cooking medium condition is obtained by metering steam into the housing 12 through steam dispensing piping 42 which may be any of many configurations. Preferred steam piping requires individually controlled outlets near baffle opening 50a and duct passages 40b and 40c. With the accurate temperature sensing and controls provided for heater 34, and the accurate humidity sensing and steam admission controls provided, it is possible to maintain the cooking medium at nearly any desired combination of temperature and relative humidity. Temperatures can range up to 700° F. and relative humidity may range up to nearly 100 percent.

The preferred circulation of cooking medium in this embodiment of the oven 10 is best seen in FIGS. 3, 4 and 5. Circulating fans 37 at opposite ends of the housing 12 direct the medium through sub-chamber 12a toward the centrally located heater 34. The cooking medium is there mixed with products of combustion as previously described, heating the medium to operating temperature as desired. Some of the cooking medium then enters ducts 40 through communicating passages 40a, and some goes directly into sub-chamber 12b through opening 50a in baffle 50. The cooking medium in ducts 40 may enter subchamber 12b through communicating passages 40b, or may enter sub-chamber 12c through communicating passages 40c. All of the cooking medium in subchambers 12b and 12c then moves longitudinally toward either the infeed end 22 or the discharge end 24 of the oven 10, some of the cooking medium flowing in the same direction as product on the conveyor belts 26b, 28b and 30b, and some medium flowing in the direction opposite to conveyor belt travel. The cooking medium may now enter ducts 41 through communicating passages 41a and 41b, whence it is drawn upwards in ducts 41 by circulating fans 37. Entering fans 37, the medium is again directed toward the heater 34 by fans 37.

The purpose of the intricate paths for the cooking medium as described above, is to insure that all food product on all belts 26b, 28b and 30b is continuously exposed to moving cooking medium of nearly constant temperature, so that product may be evenly and expeditiously cooked in a reliable manner.

It will be readily seen that the present tiered conveyor concept of cooking oven saves considerable floor space as compared to prior art ovens which only had one conveyor mechanism disposed therein, as well as resulting in a more efficient utilization of the heat produced by burner 34 as well as more effective distribution of the cooking or heating medium through the oven for exposure of the food products thereto. While the oven illustrated is a counterflow oven with a centrally oriented source of heat for the oven, it will be understood that applicant's invention relates primarily to the tiering of the conveyor mechanisms in the oven housing, and such arrangement could be utilized with other types of food product cooking ovens.

It should be noted that the oven of this invention is recognizably more efficient in utilization of available heat energy than is an oven with a single conveyor of equal total length. Vertically tiering the conveyors saves exposure to atmospheric cooling of the roofs over conveyors 28 and 30, and the drip pans under conveyors 26 and 28. Thus the total exposure to atmospheric cooling can be reduced by about one-third in narrow ovens and up to fifty percent in wide ovens.

From the foregoing description and accompanying drawings it will be seen that the invention provides a relatively compact oven for cooking food products which comprises an elongated housing having an inlet for food product to be cooked in the oven and an outlet for emitting the cooked food product from the oven, with means for heating a gaseous cooking medium in the housing for cooking the food products therein, with a plurality of vertically tiered endless conveyor mechanisms providing for passing the food product back and forth through the oven housing during the cooking process, wherein the circulation of the cooking or heating medium through the oven is effectively directed, and wherein the available heat is more efficiently utilized.

The terms and expressions which have been used are used as terms of description and not of limitation, and there is no intention in the use of such terms and expressions of excluding any equivalents of any of the features shown or described, or portions thereof, and it is recognized that modifications are possible within the scope of the invention claimed.

I claim:

1. An oven for cooking food products comprising an elongated housing having an inlet for food products to be cooked in said oven and an outlet for emitting cooked food products from said oven, heating means for heating a gaseous cooking medium in said housing for cooking food products therein, said housing being divided internally into vertically tiered longitudinally extending subchambers by generally horizontal baffle means, a plurality of vertically tiered conveyors for passing food products back and forth through said oven housing during the cooking process with the lowermost of said conveyors terminating generally adjacent said outlet and the uppermost of said conveyors commencing generally adjacent said inlet, said conveyors being generally permeable whereby cooking medium can pass therethrough, said conveyors being disposed in a respective one of said subchambers, said heating means being disposed generally centrally of said housing in a direction lengthwise thereof, and above said conveyors, duct means coacting with said heating means for causing application of the cooking medium to said conveyors, said duct means extending generally exteriorly of said housing and coacting with said heating means at the upper end of said duct means and with the interior of said housing at each of said subchambers for directing the cooking medium to the respective subchamber, and fan means coacting with said housing and said subchambers at opposite ends thereof operable to cause division of the cooking medium applied to each said subchamber into two separate streams, one stream flowing in the direction of the respective conveyor product movement and the other stream flowing in a direction opposite to the direction of product movement of the respective conveyor, said fan means being operable to cause flow of the cooking medium in generally encompassing relation to the respective conveyor and then upwardly and back toward said generally centrally located heating means, whereat the cooking medium in both of said streams is reheatable for reuse in the cooking process.

2. An oven in accordance with claim 1 including hydraulic motor means operatively connected to each of said conveyors for driving the latter.

3. An oven in accordance with claim 1 wherein said outlet is disposed at the opposite end of said housing as compared to said inlet, said plurality of conveyors comprising three individual conveyors with the uppermost conveyor and the lowermost conveyor each having a longer lengthwise dimension as compared to the lengthwise dimension of the intermediate conveyor, said uppermost conveyor and said intermediate conveyor being disposed in the same one of said subchambers, said lowermost conveyor being disposed in the next lower subchamber, and said heating means being disposed in another subchamber located immediately above said one subchamber.

4. An oven in accordance with claim 1 wherein said housing comprises an upper section and a lower section with the upper section being removable vertically from said lower section to provide access to the interior of said housing, and means for sealing the juncture of the upper and lower sections to prevent egress of said cooking medium therefrom.

5. An oven in accordance with claim 1 including means for applying moisture vapor into said housing for intermixture with said cooking medium to further the process of cooking food product in said oven.

6. An oven in accordance with claim 3 wherein the distal end of said uppermost conveyor is disposed above said intermediate conveyor and spaced lengthwise inwardly from the commencing end of said intermediate conveyor disposed therebelow, and wherein the distal end of said intermediate conveyor is disposed above the commencing end of said lowermost conveyor and in inwardly spaced relation from the commencing end of said lowermost conveyor whereby food products passing through said housing on said conveyors are discharged from one conveyor to the next underlying conveyor for eventual emission at said outlet of said housing.

7. An oven in accordance with claim 1 wherein the uppermost of said baffle means is interrupted in the area immediately below said heating means whereby the heated cooking medium from said heating means is movable downwardly through said interrupted area of said uppermost baffle means into contact with an uppermost one of said conveyors, said duct means coacting with spaced openings in said housing for applying cooking medium from said heating means both above and below said conveyors.

8. An oven in accordance with claim 7 wherein said uppermost baffle means has diagonally upwardly extending sections at said interrupted area thereof, said duct means communicating with said interior of the respective subchamber via a respective one of said openings in said housing at said respective subchamber.

9. An oven in accordance with claim 1 wherein there are provided three subchambers, said plurality of conveyors comprising three individual endless conveyors with the uppermost conveyor and the lowermost conveyor each having a longer lengthwise dimension as compared to the lengthwise dimension of the intermediate conveyor, said uppermost conveyor and said intermediate conveyor being disposed in the same one of said subchambers, said lowermost conveyor being disposed in the next lower subchamber, and said heating means being disposed in another subchamber located immediately above said one subchamber, the uppermost of said baffle means being interrupted in the area thereof immediately below said heating means whereby the heated cooking medium from said heating means is movable downwardly through said interrupted area of said uppermost baffle means into contact with said uppermost one of said conveyors, said uppermost baffle means including diagonally upwardly extending sections at said interrupted area thereof for aiding in directing the cooking medium flow in said one and said other subchamber, and said duct means coacting with spaced openings in said housing for applying cooking medium from said heating means both above and below said conveyors.

10. An oven in accordance with claim 9 wherein said opening in said housing communicating said duct means with the intermediate subchamber is disposed intermediate said uppermost and said intermediate conveyors, and wherein said opening in said housing communicating said duct means with the lowermost subchamber is disposed below the upper run of said lowermost conveyor.

11. An oven in accordance with claim 5 wherein said moisture applying means includes means for applying moisture vapor to each respective subchamber in which said conveyors are located.

12. A method for cooking food products in an oven including an elongated housing having an inlet for food products to be cooked in the oven and an outlet for emitting cooked food products from the oven, comprising the steps of, passing the food products back and forth through the housing from one conveyor to another conveyor disposed in vertically tiered relation with respect to one another in the oven housing while applying gaseous cooking medium to the conveyors whereby a lesser lengthwise dimension of apparatus is required for cooking a predetermined food product, said housing being divided internally into vertically tiered longitudinally extending subchambers by generally horizontal baffle means, said conveyors being disposed in a respective one of said subchambers with said conveyors being generally permeable whereby cooking medium can pass therethrough, said applying of said cooking medium to said conveyors being accomplished by providing a heating means generally centrally of said housing in a direction lengthwise thereof above said conveyors, distributing the cooking medium from said heating means to each of said subchambers via duct means extending generally exteriorly of said housing and coacting with said heating means at the upper end of said duct means and with the interior of said housing at each of said subchambers, said duct means communicating with each respective subchamber whereby the cooking medium is applied to said conveyors in each respective subchamber, providing fan means adjacent each end of said housing in coacting relation to said subchambers, and operating said fan means in a manner to cause division of the cooking medium applied to each said subchamber into two separate streams, one stream flowing in the direction of the respective conveyor product movement and the other stream flowing in a direction opposite to the direction of product movement on the respective conveyor, whereby the cooking medium generally encompasses the respective conveyor with each stream thereof moving toward a respective end of said housing and then upwardly and back toward said centrally located heating means, and then reheating the cooking medium in both of said streams by said heating means for reuse in the cooking process.

13. A method in accordance with claim 12 including the step of applying cooking medium both above and below said conveyors during the actuation of the conveyors through the housing.

* * * * *